Sept. 3, 1946. W. J. D. VAN DIJCK Re 22,788

EXTRACTION PROCESS

Original Filed Oct. 19, 1933

Inventor: Willem Johannes Dominicus Van Dijck

By his Attorney: James Todorovic

Reissued Sept. 3, 1946

Re. 22,788

UNITED STATES PATENT OFFICE 22,788

EXTRACTION PROCESS

Willem Johannes Dominicus van Dijck, The Hague, Netherlands, assignor to Shell Development Company, San Francisco, Calif., a corporation of Delaware Original No. 2,081,720, dated May 25, 1937, Serial No. 694,280, October 19, 1933. Application for reissue March 15, 1946, Serial No. 654,663. In the Netherlands November 18, 1930

23 Claims. (Cl. 196—13)

Figures 1, 2, 3:
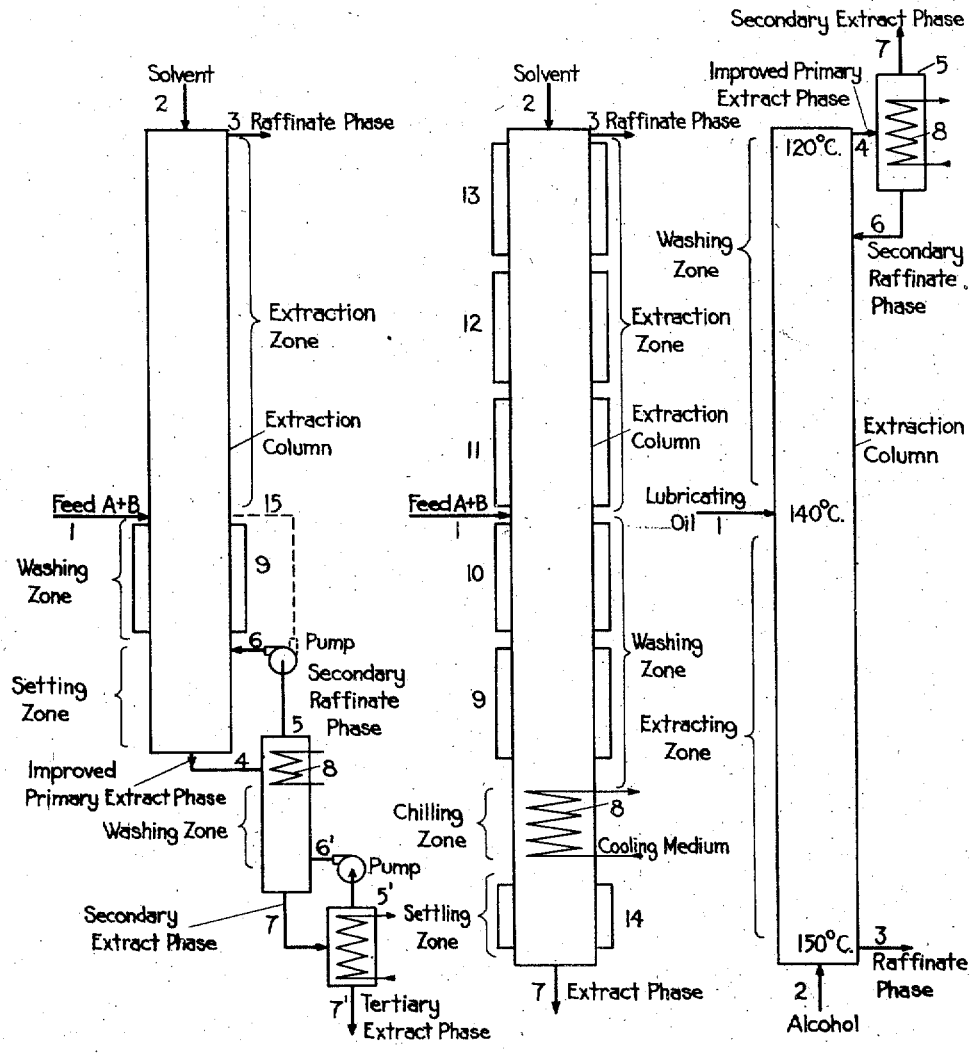

This invention relates to extraction processes and constitutes an improvement thereof directed to increase the yield and improve the purity of substances or groups of substances which are obtainable by extraction of liquid mixtures containing the same. The present application is a continuation in part of the application Serial No. 567,970 filed October 9, 1931.

While extraction processes for separating components of liquid mixtures were known for a long time, the degree of separation, as represented by the yield and/or purity of the obtained products, was ordinarily considered to be limited by the dissolving capacity and the selectivity of the solvent at the most favorable uniform operating temperature. As an advancement in the extracting art, the principle of continuous countercurrent operation is now being widely applied.

More recently it was proposed to extract liquid mixtures by means of two partially miscible solvents, flowing countercurrently to and in contact with each other and through the mixture being extracted, whereby the component soluble in the corresponding solvents are separated from the mixture. It was also proposed to substitute one of such selective solvents by one of the components previously separated from the mixture.

It is known further to operate the extraction processes so that the extract and raffinate phases are separately removed from an extraction zone or column and chilled. As a result each of these primary phases is caused to separate into secondary extract and raffinate phases outside of the extraction zone, and the secondary raffinate phase chilled out of the primary extract phase is returned to the zone at a point near the entering fresh feed and is mixed therewith, while the secondary extract phase, chilled out of the primary raffinate phase, is returned to the main column at a point near the entering fresh solvent; the secondary extract and raffinate phases not returned to the column are freed of solvent. The purpose of such chilling is to obtain a better extract and a better raffinate than those which would be obtained from the extraction zone at a normal or elevated temperature. The same effect may be produced by chilling both ends of an extraction zone or column just beyond the point of entrance of the feed and the solvent. This process is described in the German Patent No. 410,169. The particular feature of the process of this type is that the composition of the secondary extract phase separated from the primary one by cooling will remain constant, as it is fixed only by composition of the intake, the relative quantity of solvent and the temperature of cooling.

As an improvement of the above outlined extraction processes, the present invention contemplates among other features a countercurrent washing of the primary extract phase produced in an extraction zone with a secondary raffinate phase chilled out of a primary extract phase obtained in an earlier operation of the process. As a result of this washing the composition of the ultimate extract phase produced in the process can be conveniently regulated and improved in the manner and to the degree unobtainable in the old processes which did not employ this washing step.

In the description of the process of this invention the following nomenclature will be employed:

A and B are components of the mixture to be extracted.

The term "component" applies to a portion of a mixture to be extracted, which portion is distinct from other portion or portions of the same mixture in its chemical and/or physical properties, in that it can be either partly or completely separated from said mixture in a more or less pure state by solvent extraction.

The terms "solvent" or "selective solvent" apply to a preferential solvent for B when both components are brought into contact with said solvent; it may have either lower or higher specific gravity than that of the A+B mixture, and may be either partly or totally miscible with B at the extraction temperature.

The term "auxiliary solvent" applies to either a non-selective solvent or a preferential solvent for A used in conjunction with the selective solvent; preferably it should be only partly soluble, if at all, in the selective solvent.

The terms "primary raffinate phase" and "primary extract phase" apply to the liquid phases (with relatively low and high contents of the solvents respectively) obtainable from the extraction zone, or a column.

The term "secondary raffinate phase" applies to the raffinate phase seperated from an extract phase by cooling or by wholly or partially evaporating the solvent from the extract phase and contingently cooling the remainder. Its solvent content is always lower than that of the original extract phase.

The term "secondary extract phase" applies to the extract phase remaining when the secondary raffinate phase has been removed from an extract phase e. g. by cooling.

The terms "raffinate" and "extract" apply to the solvent-free portions of the respective phases.

The term "improved or better extract" applies to an extract with a comparatively greater concentration of B.

The term "improved or better raffinate" applies to a raffinate with a comparatively greater concentration of A.

The term "improved or better extract phase" applies to an extract phase containing an improved extract.

The term "improved or better raffinate phase" applies to a raffinate phase containing an improved raffinate.

The term "extraction column" applies to a single extraction column or a series of interconnected mixing and settling zones, or columns, which, as far as the compositions of liquids flowing therethrough are concerned, may be regarded as sections of a single column.

The term "extraction zone" applies to the section of the extraction column between the entrance of the selective solvent and that of the mixture being extracted.

The term "washing zone" applies to a zone having a substantial length through which the primary extract phase is to flow under conditions of this invention. The washing zone is adjacent and below the feed when a relatively heavy solvent is used, and above the feed when a relatively light solvent is used. The feed is introduced between the extraction and washing zones.

It is an object of this invention to provide an extraction process whereby the composition and/or yield of a secondary extract may be improved at will without resorting to the employment of a chilling process only as would be necessary for producing an analogous, improved extract by old methods using one solvent.

Briefly, the invention resides in the discovery that when a stream of the primary extract phase is allowed to flow down from the feed level, as it would be, for example, in the case of employing a relatively heavy solvent, through a washing zone of a substantial length, at the end of which zone for example this stream is chilled, to a suitable temperature, so that a secondary raffinate phase and a secondary extract phase are formed, this secondary raffinate phase, which is thus richer in B than a raffinate phase in equilibrium with the primary extract phase at the elevated temperature, being allowed to rise through and mix (contact) over a substantial length with the descending stream of the primary extract phase within said washing zone and below and away from the incoming feed, then, as a result of this contacting, the compositions of both these phases change, so that an improved primary extract phase would reach the chilled part of the zone and following this an improved secondary extract phase will separate from the chilled mixture. The new secondary raffinate phase to be returned to the washing zone, which will be in equilibrium with the improved secondary extract, will be still richer in B, and will enrich still more the descending stream of the gradually improving primary extract phase with the component B.

The rising cold secondary raffinate phase formed upon chilling the primary extract phase will meet a stream of the primary extract which comes from a hotter region. The result will be a change in temperature of both phases, which will cause an exchange of components between the two phases, as at the changed temperature the solubility relations have changed also.

It may be, however, that the temperature of the descending stream is so high, that when the two phases in question meet at a certain point of the washing zone, owing to the exchange of heat the temperature of the mixture becomes so high that a complete miscibility of the two phases present at the point under discussion occurs. If however, two phases cannot exist next to each other, no washing can be carried out.

Now, it is a feature of this invention that the temperature throughout at least a substantial length of the washing zone under discussion should change as gradually as possible, as it has been found that this feature will prevent complete miscibility of the two phases at any point of the washing zone.

This temperature gradient may be created by cooling down the primary extract phase so far that the secondary raffinate phase formed thereby is so cool that when it rises its temperature is gradually changed by contact with the downcoming warm stream of the primary extract phase, and the temperature within the washing zone is caused to be so low that there never occurs a complete dissolution of the phases.

As, however, the cooling of the primary extract phase also causes a certain amount of secondary raffinate to be formed, it is evident that these two magnitudes, i. e. the amount of the secondary raffinate and its temperature, cannot be varied independently, although for the washing process under discussion only the temperature of the washing zone has to be regulated. Furthermore in applying this method the temperature change throughout the zone cannot be controlled at will. It is therefore advantageous to control the temperature throughout the washing zone at the place where this has to be done e. g. by outward means, such as cooling jackets, so that it is not necessary to rely upon the effect created by the cooled secondary raffinate alone.

From the above it is observed that by the continuous chilling of the primary extract phase at the end of the washing zone and by continuously returning the secondary raffinate phase to said zone to rise through and contact with the primary extract phase, thereby taking care that as far as possible a gradual change in temperature is maintained throughout the washing zone, the composition of the secondary extract phase will be improved so that by regulating the amounts of the feed (A+B) and the solvent, while maintaining a fixed temperature at the chilling zone, various degrees of purity and even the theoretical limit of purity of the extract phase can be attained.

In order more clearly to describe the operation of the process, a reference is to be had in Figs. 1 and 2 of the drawing diagrammatically showing two extraction columns, in cross section, adapted for practicing the invention; Fig. 3 represents a similar view of the column adapted for carrying out the extraction process hereafter specifically described.

Fig. 1 of the drawing represents a vertical extraction column provided with pipe connections 1, 2, 3 and 4, for introducing the feed and the solvent, and for withdrawing the raffinate and extract phases, respectively. The extraction column communicates with a cooler 5 through the pipes 4 and 6, the latter being provided with the pump, if necessary, for conducting a liquid from the top of the cooler to a point of the column which is remote from the pipe 1. A pipe 7 is provided to withdraw a liquid from the bottom of the cooler 5. This cooler is provided with a cooling means, such as the cooling coil 8, adapted to maintain the contents of the cooler at a temperature below that of the bottom part of the column.

In practice, the length of the extraction zone of the column, i. e. its upper part, or the number of mixing and settling stages in the extraction zone, is so selected as to insure the desired composition of the raffinate phase at the top of the column, while the feed A+B is introduced at or near the level of the column where the raffinate phase which is rising through the column and is undergoing extraction contains a raffinate of substantially the same composition as the feed. The lower part between pipes 1 and 6 must be of a substantial length in order to provide for proper countercurrent contact between secondary raffinate phase and primary extract phase and to cause the composition of the secondary raffinate to approach the composition of the feed, and below pipe 6 for settling out of the improved primary extract phase to be withdrawn into the cooler 5.

In the operation of this extraction apparatus, when the feed and the solvent are supplied to the column through their respective pipe connections, two streams of phases are formed within the extraction zone of the column. The raffinate phase is collected at the top and withdrawn through the pipe 3, while the extract phase, i. e. the phase with greater solvent content, settles down and tends to collect below the feed pipe 1. This extract phase is withdrawn from the column through the pipe 4 into the cooler 5, where it is chilled and caused to separate into secondary raffinate and secondary extract phases; these are allowed to settle out and are withdrawn from the cooler through pipes 6 and 7, respectively. The secondary raffinate phase is returned to the column through the pipe 6 and contacted with the descending primary extract phase with the result that an improved primary extract phase is withdrawn through the pipe 4. A further improved secondary extract phase is separated in the cooler and withdrawn therefrom. As the operation is continued, the process of improving the composition of the secondary extract phase progresses, tending to reach certain limits fixed by the operating and solubility conditions within the system, with the result that an extract rich in B and poor in or often even substantially free of A can be obtained. It may be found desirable especially in case of some solvents, in order to increase the efficiency of separating the mixture A+B into its components to regulate the temperature gradient from the top to the bottom of the column, that the upper part thereof would be operated at relatively elevated temperatures, while the lower part would be cooled to relatively low temperatures (when a relatively heavy solvent is used; vice versa in case of a light solvent) all the temperatures being determined by solubility characteristics of the components and the solvent and their relative proportions at each level within the entire column. If desired, the process may be modified by adding to the apparatus of Fig. 1 a second cooler 5' similar to and communicating with the cooler 5 through pipes 6' and 7, and provided with a pipe 7' for withdrawing a tertiary extract phase, which will contain a better extract than the secondary one; the operation of the cooler 5 is analogous to the manner of operation of the lower section of the column.

The ultimate extract phase, as well as the raffinate phase from the top of the extraction column, after being withdrawn from the extraction process, are separately treated to separate the extract and the raffinate, respectively, from the solvent.

An essential feature of the process illustrated by Fig. 1 is the reintroduction of the secondary raffinate phase through the pipe 6 into the main column at a point so remote from the feed pipe 1 that this secondary raffinate phase upon being introduced into the column and owing to the fact that a temperature gradient is maintained, would so change its composition, while rising to the level of the feed, that its solvent-free portion at that level would approach as nearly as possible the composition of the feed. The extract phase separating near and below the level of the pipe 6 will then be an improved primary extract phase, formed principally not by lowering of the temperature at that part of the column, but as a result of the countercurrent washing of the primary extract phase with the secondary raffinate phase. It follows then, that the distance between the entrance of the feed and that of the secondary raffinate phase, i. e. the washing zone, which should be of an appreciable length, which is to be referred to as an effective length or distance. This length may be different for different solvents and mixtures to be extracted and is a function of various properties such as their gravities, viscosities and solubility characteristics should prevail in the lower washing zone of the cooler 5 when the cooler 5' is used, as described.

To point out more clearly the difference between the new process and such old methods as the ones described in the German patent, it will be noted that in accordance with that old method the secondary raffinate phase should be returned by means of pipe 15 (broken line of Fig. 1) near the level of the pipe 1. Such method, while producing a secondary extract phase of a better composition than the primary extract phase, will not operate in such a manner as progressively to improve said composition, but would produce a fixed composition corresponding to an extract phase which would result from merely cooling the primary extract in the cooler 5, without the production of the improved primary extract, as in the process of this invention.

While as was stated above it is evident that a certain change in temperature will be established within the washing zone due to the difference in temperatures at the feed and the secondary raffinate phase, this condition may be modified or improved by providing an additional cooling means 9 intermediate the feed and the entrance of the secondary raffinate phase.

From the foregoing explanation it would follow that the step-wise processes of Fig. 1 can be carried out in the manner illustrated by Fig. 2, which represents an extraction column provided with pipe connections 1, 2, 3 and 7 for introducing the mixture to be extracted and a solvent and withdrawing the raffinate and extract phases, respectively. A cooling means, such as a cooling coil 8, is provided at the lower section of the column, forming a chilling zone and a washing zone of an effective length. Cooling means 9 and 10 may be provided along the washing zone in order to maintain a gradual temperature drop from the level of the feed towards the chilling zone. A settling zone, insulated by means 14, if desired, may be provided at the bottom of the column.

The operation of the process of this type is different from the process as shown in Fig. 1 only in that the washing of the descending extract phase below the feed is gradual throughout the washing zone of an effective length, i. e. is not step-wise as shown in Fig. 1, while the principle involved and the result are the same, that is the ultimate extract phase withdrawn through pipe 7 is much better than the extract phase, which it would be possible to obtain by withdrawing the extract phase immediately below the feed and chilling it to the same temperature as is had near the coil 8, even if the secondary raffinate phase in this case would be returned to the column near the feed level.

It was also found that the efficiency of separating components A and B from their mixture by extraction with a solvent can be increased, if the oil content of the downward stream of the extract phase within the column is maintained substantially constant. To accomplish this, heating means 11, 12 and 13 may be provided to maintain a gradually decreasing temperature within the extraction zone in the direction of flow of the extract phase, while the cooling means 8, 9 and 10 may be used within the washing zone.

By practicing the above described invention it is possible to extract a mixture with less solvent than would be required by the old methods, and the yield and purity of the products can be substantially increased.

The process according to the invention is not restricted to the use of preferential solvents heavier than the mixture to be separated, as the preferential solvent may have a lower specific gravity than the mixture to be extracted, in which case the extract phase of the mixture is caused also to pass through regions of gradually and effectively lowering temperature, so that the lowest temperature prevails at the part of the extraction zone near the point where the extract phase is being collected and withdrawn, (top of the extraction column, for example) while a relatively higher temperature is maintained at the part of the zone, near which the raffinate phase is removed (bottom of the extraction column, for example).

The process may be further explained by the following example illustrated by Fig. 3 diagrammatically representing in cross-section another form of the extraction apparatus which was used in carrying out the extraction hereafter described. The extraction column was provided near one end with a solvent inlet pipe 2 and with an oil feed pipe 1 near the middle of the column. At each end of the column draw off pipe connections 3 and 4 were provided for withdrawing the separated phases. One of these pipe connections, namely, the extract phase draw off line, was connected to a cooler 5, provided with a coil 8 and pipe connections 6 and 7. The cold secondary raffinate phase produced by cooling was withdrawn from the bottom of the cooler 5 through the pipe connection 6 and was then returned to the extraction column entering the column near the end from which the extract phase was being withdrawn.

The continuous process, as carried out in this apparatus consisted of introducing a stream of lubricating oil to be extracted into the column through the pipe 1 and feeding at the same time 96% alcohol through the pipe 2. Due to the lower specific gravity of the alcohol as compared to that of the oil, and due to the fact that the oil and the alcohol are not miscible with each other, but form, on being contacted beyond certain known proportion limits, two phases, such phases were formed and withdrawn at the respective ends of the column. The raffinate phase descended through the extraction zone towards the incoming alcohol and was withdrawn through the pipe 3, while the extract phase was withdrawn at the top to the cooler 5, where it was chilled. The separated secondary raffinate phase was withdrawn by means of pipe 7 and the raffinate phase was returned to the column by the pipe 6. The temperatures within the column were maintained as follows: 120° C. at the top, 140° C. near the entrance of the lubricating oil, and 150° C. at the bottom of the column. A highly naphthenic extract was obtained. The described process was carried under superatmospheric pressure in order to eliminate the formation of vapors.

It is obvious that the above extraction could be carried out by eliminating the cooler 5 and providing, instead a chilling zone near the top of the column, by placing a cooling means in that part of the column, thereby forming a washing zone similar to that shown in Fig. 2, through which the secondary raffinate phase would then have descended, while gradually changing its composition, and above which the secondary extract phase would have been withdrawn.

It is possible to produce the secondary raffinate phase by withdrawing the primary extract phase from the column at the end of its travel through the washing zone. There are several methods of producing from this liquid the secondary raffinate phase necessary to carry out the countercurrent washing process throughout the washing of the process of the invention.

Bearing in mind that the secondary raffinate phase must be co-existent with the primary extract phase at the point where this secondary raffinate phase is introduced into the washing zone and at the temperature prevailing there, it may be that the primary extract phase withdrawn from the column only consists of a saturated solution of the pure component B in the selective solvent. In order to make sure that this solution always contains only B it must be continuously in equilibrium with a phase containing only B and no A. It may contain some solvent, but this is not necessary, for a liquid consisting practically entirely of B can be in equilibrium with a saturated solution of B in the solvent.

In order to prepare such an equilibrium solution it is therefore possible to evaporate partly or wholly the solvent from the primary extract phase of the above assumed character, and to use a part of this solution as secondary extract phase. Attention may be drawn to the fact that when the whole of the solvent is evaporated there is no difference in composition between the secondary extract and the secondary raffinate phase.

The method of partially or wholly evaporating the solvent from the primary extract withdrawn from the column and using a part of the liquid obtained as secondary raffinate phase, is also applicable when no pure component B is made as extract.

It is also possible to evaporate partly the solvent from the primary extract phase, the liquid to be subsequently cooled to a suitable temperature, so that it separates into a secondary raffinate and an extract phase, and the cooled secondary raffinate phase, i. e. that with the low solvent content, to be returned to the washing zone of the column at an effective distance from the feed.

If the secondary raffinate phase formed by the above methods is co-existent with the primary extract phase at the temperature at which it is introduced, it will act as a washing agent when at another level it is contacted at a higher temperature with the primary extract phase, travelling countercurrently.

Comparing the process with that in which a liquid mixture is extracted with two non-miscible solvents flowing in countercurrent to each other, it may be said that whereas in the first process two phases created by two solvents traveling throughout the whole column and laden with the component of the mixture are required, with the present process it is not necessary that two solvents travel throughout the whole column, it being only necessary to maintain two phases. One of these phases comprises the preferential solvent laden with components, whereas the second phase flowing in countercurrent thereto contains no auxiliary solvent flowing through the whole column and is not laden with components but has a changing composition, a temperature gradient being necessary to prevent this second phase from disappearing as phase in a certain part of the column.

It goes without saying that a process as described in the present specification can be repeated several times both with the secondary extract and the raffinate obtained with the combined extraction and washing processes. Each of the products of this first combined process is then extracted and washed separately with a solvent, either the same as that used in the first combined process or another solvent. It is not necessary to carry out all these processes at the same temperature or within the same temperature range.

Such a process is specially recommendable when the initial product consists of various series of products, the members of which possess properties which are mutually not widely divergent. The first extracting-agent can then, for example, be used to separate the groups of homologues, whereas with a more selectively acting and often much more expensive extracting-agent the operation is continued with a smaller quantity of initial product, which presents the advantage of smaller quantities being required of the second auxiliary liquid.

The method of this invention may be applied to extractions of different kinds of liquids, such as hydrocarbon oils, e. g. mineral oils and their distillates, tars or to the extraction of fatty acids such as acetic acid, from their aqueous solutions with various selective solvents, such as liquid $SO_2$, furfural, isopropyl alcohol, aniline, nitrobenzene, Chlorex, phenols, organic nitriles and thiocyanates, ketones, aldehydes, esters such as amylacetate and others. It may also be used in two-solvent extractions, wherein one of the solvents is a selective solvent, while the other is an auxiliary solvent; in this case the operation of the method as described for a single-solvent extraction, would be the same as if only the selective solvent were used.

I claim as my invention:

1. In a countercurrent process for extracting a liquid mixture of hydrocarbons wherein a raffinate phase flows in contact with and countercurrently to an extract phase the step of maintaining a gradual temperature drop within the mixture of the two flowing phases in the direction of flow of the extract phase.

2. In the process of extracting a liquid mixture of components in an extraction zone with a selective solvent for one of said components to produce an extract phase and a raffinate phase having different specific gravities, the improvement which comprises the steps of withdrawing the extract phase from the extraction zone, flowing it through a washing zone in countercurrent to a washing liquid subsequently described to produce a phase which has a low solvent content and a washed extract phase, chilling the washed extract phase to separate from it a solute phase, and using the separated solute phase as the washing liquid.

3. In an extraction process carried out by means of an extraction apparatus having extraction and washing zones and provided with means for introducing a solvent and a mixture to be extracted, and means for withdrawing the ultimate raffinate and extract phases produced by the process, the steps of introducing the solvent and the mixture into the apparatus, separately withdrawing said phases therefrom, removing the solvent from the withdrawn extract phase, returning a part of the extract into the apparatus at an effective distance from the entrance of the mixture and subjecting the liquids flowing through the washing zone to a thermal treatment to create a gradual temperature drop in the direction of flow of the extract phase.

4. In an extraction process carried out by means of an extraction apparatus having extraction and washing zones and provided with means for introducing a solvent and a mixture to be extracted, and means for withdrawing the ultimate raffinate and extract phases produced by the process, the steps of introducing the solvent and the mixture into the apparatus, separately withdrawing said phases therefrom, removing from the withdrawn extract phase a portion of the solvent, cooling the remaining portion of the phase, thereby causing its separation into secondary raffinate and extract phases, separating the two cooled secondary phases and returning the cooled secondary raffinate phase into the apparatus at an effective distance from the entrance of the mixture.

5. In a countercurrent process of extraction wherein a raffinate phase flows in contact with and countercurrently to an extract phase the step of regulating the heat content of the flowing phases so as to cause a gradual temperature drop in the direction of flow of the extract phase.

6. In a process of fractionating a liquid mixture of components by countercurrently contacting a flow of the mixture with a flow of a preferential solvent so as to produce a flow of a solution of soluble components of the mixture in the preferential solvent, the step of continuing the flow of said solution after the solvent has been contacted with the liquid mixture and subjecting said continued flow to a change in temperature in such a way that the temperature decreases in the direction of said continued flow and recovering a solution of the dissolved components in the preferential solvent at the end of said continued flow and the undissolved components of the liquid mixture at the end of the flow of the liquid mixture.

7. In a process of countercurrently treating a flow of a liquid mixture of components with a flow of a preferential solvent, the step of subjecting the flow of the solvent after it has taken up a quantity of the liquid mixture soluble in the solvent to a change in temperature over a substantial length of the continued flow of the solvent after the latter has been contacted with the liquid mixture, said change in temperature being provided in such a way that the temperature decreases in the direction of flow of the solvent and recovering a solution of the dissolved components in the preferential solvent at the end of its continued flow and the undissolved components of the liquid mixture at the end of the flow of the liquid mixture.

8. The process of separating a mixture of liquid components into two components, which comprises introducing a flow of said mixture into a column at a point between the top and the bottom thereof, contacting said mixture in said column with a countercurrent flow of a preferential liquid solvent and maintaining as far as possible a gradual change in temperature throughout at least a substantial length of that part of the column which is situated past the point of entrance of the mixture of liquid components in the direction of flow of the preferential solvent, the gradual change of temperature being such that the temperature decreases in the direction of flow of the preferential solvent and recovering the less soluble component at a point past the point of entrance of the mixture in the direction of the flow of said mixture and the more soluble component dissolved in the preferential solvent at a point past the point of entrance of said mixture in the direction of flow of the preferential solvent.

9. The process of claim 23, wherein the mixture to be extracted is introduced into the apparatus at a point where the solvent-free portion of the raffinate phase has substantially the same composition as that of the mixture.

10. The process of claim 23, wherein the contents of the apparatus within the washing zone are in addition progressively cooled throughout said effective distance.

11. The process of claim 23, wherein a gradual temperature gradient is maintained throughout the extraction apparatus whereby the molal quantity of the solvent free portion of the extract phase is maintained constant throughout the column.

12. In an extraction process carried out by means of an extraction apparatus having extraction and washing zones and provided with means for introducing a solvent and a mixture to be extracted, and means for withdrawing the ultimate raffinate and extract phases produced by the process, the steps of introducing the solvent and the mixture into the apparatus, separately withdrawing said phases therefrom, subjecting the withdrawn extract phase to cooling, thereby producing a secondary raffinate phase and a new extract phase, separating these two phases and returning the cooled secondary raffinate phase into the apparatus at an effective distance from the entrance of the mixture.

13. The process of separating a mixture of liquid components into said components, which comprises contacting the mixture of liquid components with a preferential liquid solvent while the mixture of liquid components and the preferential solvent are flowing countercurrently with respect to each other in separate liquid phases in the same generally confined and elongated column of liquid comprising the said preferential solvent and the liquid components to be separated, and maintaining as far as possible a gradually changing temperature throughout the greater portion of the length of the said column of liquid, which temperature decreases in the direction of flow of the said preferential solvent, thus causing some of the more soluble component to be separated out of the said solvent in the said gradually increasingly cooler environment whereupon the liberated more soluble component dissolves the less soluble component present in and moving out of the preferential solvent and flows countercurrently to the said preferential solvent, causing the more soluble component to be gradually redissolved by the said preferential solvent, and finally recovering the less soluble component and the more soluble component dissolved in the said preferential solvent at opposite ends of the said column of liquid.

14. The process of separating a mixture of liquid components into said components, which comprises contacting the mixture of liquid components with a preferential liquid solvent while the mixture of liquid components and the preferential solvent are flowing countercurrently with respect to each other in separate liquid phases, the preferential solvent having a greater specific gravity than the mixture of liquid components, whereby the said preferential solvent will flow downwardly in the same generally confined and elongated column of liquid comprising the said preferential solvent and the liquid components to be separated, and maintaining as far as possible a gradually changing temperature throughout the greater portion of the length of the said column of liquid, which temperature decreases in the direction of flow of the said preferential solvent, thus causing some of the more soluble component to be separated out of the said solvent in the said gradually increasingly cooler environment, whereupon the liberated more soluble component dissolves the less soluble component present in and moving out of the preferential solvent and flows countercurrently to the said preferential solvent, causing the more soluble component to be gradually redissolved by the said preferential solvent, and finally recovering the less soluble component and the more soluble component dissolved in the said preferential solvent at opposite ends of the said column of liquid.

15. In the process of extracting a liquid mixture of components in an extraction zone with a selective solvent for one of said components to produce an extract phase and a raffinate phase having different specific gravities, the improvement which comprises the steps of withdrawing the extract phase from the extraction zone, flowing it through a washing zone in countercurrent to a washing liquid subsequently described to produce a phase which has a low solvent content and a washed extract phase, maintaining a gradual temperature drop in the washing zone in the direction of flow of the extract phase, the temperature of the extract phase after it has traversed at least a substantial portion of the length of the washing zone being low enough to cause a solute phase to separate from it, and using the separated solute phase as the washing liquid.

16. In the process of extracting a liquid mixture of hydrocarbon components in an extraction zone with a selective solvent for one of said components to produce an extract phase and a raffinate phase having different specific gravities, the improvement which comprises the steps of withdrawing the extract phase from the extraction zone, contacting it in a washing zone with a washing liquid subsequently described to produce a phase which has a low solvent content and a washed extract phase, chilling the washed extract phase to separate from it a solvent-poor phase, and using it as the washing liquid.

17. A process according to claim 2 which comprises the steps of withdrawing the washed extract phase from the washing zone, chilling it to separate it into a solvent phase and a solute phase, separating said phases, and returning at least a portion of the solute phase to the washing zone as the washing liquid.

18. A process according to claim 2 in which the extract phase is chilled to separate out a solute phase while it is within the washing zone.

19. The process according to claim 2 which comprises the steps of removing at least some of the solvent from the washed and chilled extract phase and returning a portion of the resulting solvent-poor extract phase to the washing zone as a component of the washing liquid.

20. In the process of extracting a liquid mixture of components in an extraction zone with a selective solvent for one of said components to produce an extract phase and a raffinate phase having different specific gravities, the improvement which comprises the steps of withdrawing the extract phase from the extraction zone, flowing it through a washing zone in countercurrent to a washing liquid subsequently described to produce a phase which has a low solvent content and a washed extract phase, maintaining a gradual temperature drop in the washing zone in the direction of flow of the extract phase, withdrawing the washed exetract phase from the washing zone, removing at least some of the solvent from the washed extract phase, and returning a portion of the resulting solvent-poor extract phase to the washing zone as the washing liquid.

21. In the process of extracting a mineral oil with a liquid solvent wherein some of the oil components are more readily soluble than other oil components the step of commingling the oil and the solvent under conditions to form a primary extract phase and a primary raffinate phase, separating the phases, flowing the primary extract phase through a washing zone countercurrently and in contact with a washing liquid subsequently described to produce a phase which has a low solvent content and a washed extract phase, chilling the washed extract phase to separate from it a secondary raffinate phase and using the separated secondary raffinate phase as the washing liquid.

22. The process of claim 23, wherein a gradual temperature gradient is maintained through the extraction apparatus whereby the molal quantity of the solvent-free portion of the extract phase is maintained substantially constant at least within the washing zone.

23. In an extraction process carried out by means of an extraction apparatus having extraction and washing zones and provided with means for introducing a solvent and a mixture to be extracted, and means for withdrawing the ultimate raffinate and extract phases produced within the apparatus, the steps of introducing the solvent and the mixture into the apparatus, separately withdrawing said phases therefrom and chilling the contents of the apparatus at the remote end of the washing zone at an effective distance from the entrance of the mixture, thereby creating a gradual change in temperature throughout at least the washing zone.

WILLEM JOHANNES DOMINICUS VAN DIJCK.